2 Sheets-Sheet 1.

H. Tucker,

Bed Bottom.

No. 683. Reissued Apr. 5, 1859.

Witnesses.
J. B. Crosby
Ira C. Porter

Inventor.
Hiram Tucker

N. PETERS. PHOTO-LITHOGRAPHER, WASHINGTON, D. C.

2 Sheets-Sheet 2.

H. Tucker,

Bed Bottom.

No. 683. Reissued Apr. 5, 1859.

Witnesses.

J. B. Crosby

Jas. C. Porter.

Inventor.

Hiram Tucker

N. PETERS, PHOTO-LITHOGRAPHER, WASHINGTON, D. C.

UNITED STATES PATENT OFFICE.

HIRAM TUCKER, OF CAMBRIDGEPORT, MASSACHUSETTS.

IMPROVEMENT IN SPRING BED-BOTTOMS.

Specification forming part of Letters Patent No. 13,188, dated July 3, 1855; Additional improvement June 9, 1857; Reissue No. 683, dated April 5, 1859.

*To all whom it may concern:*

Be it known that I, HIRAM TUCKER, of Cambridgeport, in the county of Middlesex and State of Massachusetts, have invented a new and Improved Spring Bed-Bottom, of which the following is a full, clear, and exact description, reference being had to the accompanying drawings, which form a part of this specification, of which—

Figure 1:
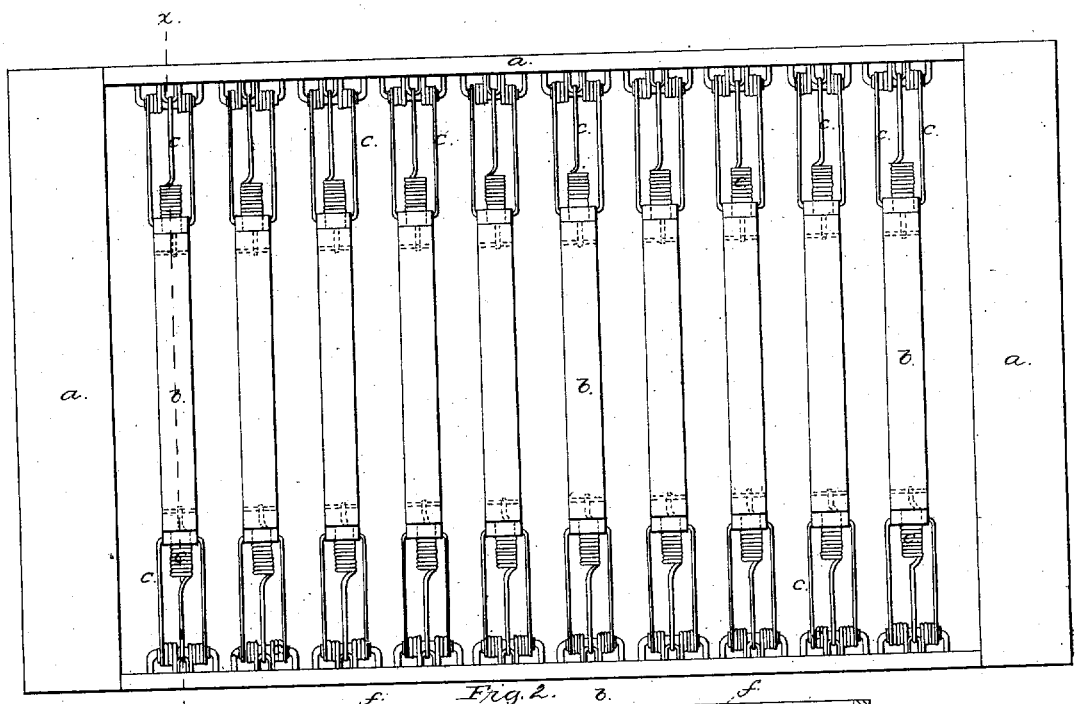
Figure 2:
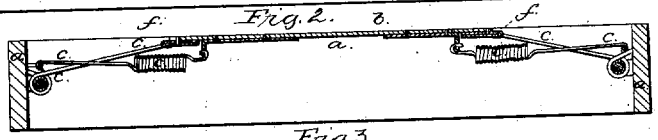
Figure 3:
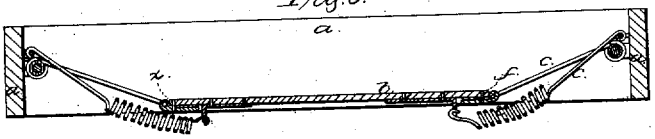
Figure 4:
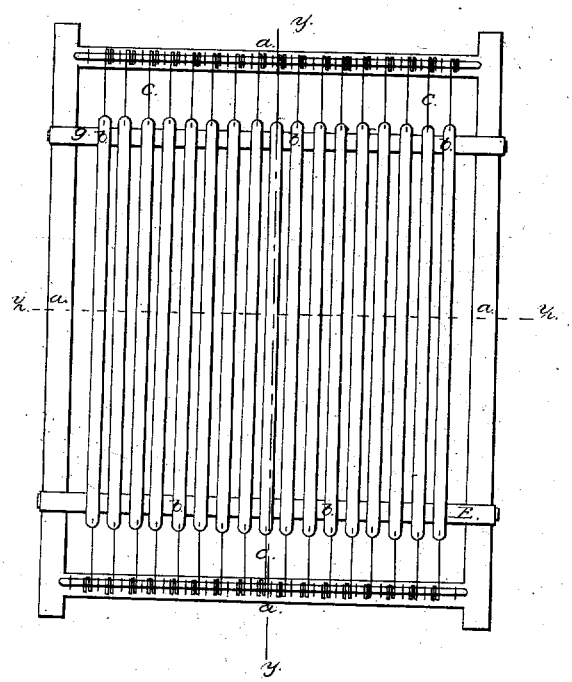
Figure 5:
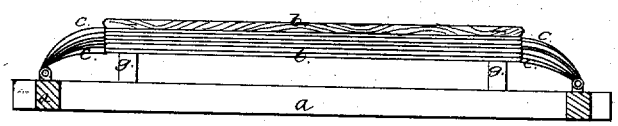
Figure 6:
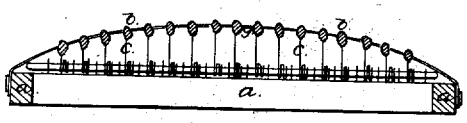

Figure 1 is a plan illustrating my invention. Fig. 2 is a cross-section taken in the line *x x*, seen in Fig. 1, showing one of the bars and other parts connected therewith in their normal position. Fig. 3 is a cross-section taken in the same plane with Fig. 2, but showing the parts in the position they assume when in use, subject to weight. Fig. 4 is a plan illustrating one of the many forms which my invention may be made to assume. Fig. 5 is a vertical longitudinal section taken in the line *y y*, seen in Fig. 4; and Fig. 6 is a vertical transverse section taken in the line *z z*, also seen in Fig. 4.

The subject-matter of my invention relates to the manner of forming a yielding foundation for the support of the bedding upon bedsteads; and it consists of a new mode of combining the parts, by which they are better adapted to the purpose of forming a comfortable and easy bed, while it is noiseless in its changes of form and more durable than other constructions for similar purposes.

The essential parts of the formation are, first, a frame to support the whole, which may be the bedstead or a frame independent of the bedstead, but arranged to be supported by it; second, a series of slats or bars, placed parallel to each other and at small distances apart, upon which the bedding is placed; and, third, what I term "radial" springs attached to both ends of each slat, and also to the frame, in such a manner that each slat is held by these springs independently of the other slats.

To enable others skilled in the art to practice my invention, I will describe the manner in which I have reduced it to practice, referring to the accompanying drawings, in which similar letters refer to similar parts.

*b b* represent the slats or bars placed transversely of the bed, as in Fig. 1, or longitudinally, as in Fig. 4. Springs made and acting substantially like the springs *c c* are attached by one end by flexible loops *f*, or by any other connection that will permit noiseless action, to the slats *b b*. The other ends of the springs are connected with or rest upon the frame or bedstead-rails *a a*. These springs may be made of various forms and may be variously connected with *a a* and *b b*, but while they retain their radial action they are but modifications of the same spring. Thus the upper springs shown in the drawings on Sheet 1 and the springs shown in the drawings on Sheet 2 are the same in form and action, except that each one of the first-mentioned springs is like the result of uniting two of those last mentioned. Both may be considered as radial bars or levers, with their ends formed into helices. By so constructing the springs a great extent of movement of the bar is permitted without requiring a corresponding movement of the flexible part of the spring, which might impair its elasticity. It is obvious, however, that when the helices upon the springs are dispensed with their radial character remains, and that they may be made efficient in all respects, if sufficient length is given them. The lower springs in first three figures, Sheet 1, are also radial springs, but of another form, having their elastic part in the middle, as shown, and acting by the extension of the helix instead of the torsion of it. These springs are interposed between the bars and frame, being connected to each, as shown, and serve to assist the other springs when the bars are much depressed, being neutral when they are in their normal position.

When the bars are arranged longitudinally with the frame, and so as to present a convex surface above it, I connect them by flexible bands *g*, which serve to keep the slats in their normal position, and also to limit the independent movement of each, and to protect the springs from injury by excessive movement or from side strains.

Prior to my invention bedding was supported on bars or slats which were sustained by hexical springs. These springs, wanting the radial character which distinguishes mine, were noisy in their action, because of their parts coming into contact with each other, and liable to be broken or permanently bent if accidentally deflected from their intended plane of action.

It has been attempted to provide against the last-mentioned casualities in this prior construction by the use of guides for the springs; but the friction which attended this arrangement has, I believe, prevented its use.

I am aware, also, that prior to my invention springs having a radial action were combined with flexible bands of steel and the frame for a bed; but this device and that last above mentioned I disclaim.

It will be obvious that my invention may be made to assume many different forms without departing from its principle.

What I claim as my invention, and desire to secure by Letters Patent, is—

The within-described spring bed-bottom, consisting of the combination of the frame *a*, slats *b*, and radial springs *c*, essentially as described.

HIRAM TUCKER.

Witnesses:

J. B. CROSBY,

IRA C. PORTER.